United States Patent [19]

Hartmann

[11] Patent Number: 5,632,082

[45] Date of Patent: May 27, 1997

[54] UNIT FOR PRODUCING A TUBE WITH A TUBE WALL COMPOSED OF FLEXIBLE MATERIAL WEBS

[76] Inventor: Peter Hartmann, General Willestrasse 115, CH-8706 Feldmeilen/Zurich, Switzerland

[21] Appl. No.: 310,670

[22] Filed: Sep. 22, 1994

[51] Int. Cl.⁶ .................................................. B23P 21/00
[52] U.S. Cl. ................... 29/782; 29/820; 138/129
[58] Field of Search ................... 118/423, DIG. 10, 118/408, 428, 33, 34; 29/779, 781, 782, 819, 820; 138/129

[56] References Cited

U.S. PATENT DOCUMENTS

| | | | |
|---|---|---|---|
| 2,555,673 | 6/1951 | Beatly | 118/423 |
| 2,865,424 | 12/1958 | McElroy | 29/782 |
| 2,993,470 | 7/1961 | Stickel | 118/423 |
| 3,332,138 | 7/1967 | Garner | 29/781 |
| 4,117,582 | 10/1978 | Borelly | 29/820 |
| 4,633,806 | 1/1987 | Schuierer | 118/423 |
| 4,689,003 | 8/1987 | Schreiner et al. | 118/DIG. 10 |
| 5,019,417 | 5/1991 | Northcult | 118/DIG. 10 |
| 5,104,592 | 4/1992 | Hunter | 118/DIG. 10 |
| 5,175,930 | 1/1993 | Okuyama et al. | 29/820 |

*Primary Examiner*—David Scherbel
*Assistant Examiner*—James F. Hook
*Attorney, Agent, or Firm*—Bachman & LaPointe, P.C.

[57] ABSTRACT

A tube with a tube wall composed of flexible material webs for covering pipe lines and for producing pipes and a unit for producing same. The tube wall is composed as a tube of two outer webs with longitudinal edges fused with one another and consisting of at least one tubular tension web made of glass fiber webs and mats lying in the interior of the outer covering. The longitudinal edges of the tension web are superimposed loosely to an overlapping, and the tension web is resin impregnated. The unit includes guide rollers, a core freely mounted on the guide rollers and made of core segments coupled with one another and having a width and an axis, clamping shafts projecting over the width of the core, reels mounted on the clamping shafts including material webs in a plurality of stations over and under the core, wherein the reels are offset with respect to the axis of the core and wherein the core extends through the plurality of stations and wherein the webs are guided around the guide rollers onto the core, and a cylinder downstream of the core being coupled to a front end of the core.

15 Claims, 4 Drawing Sheets

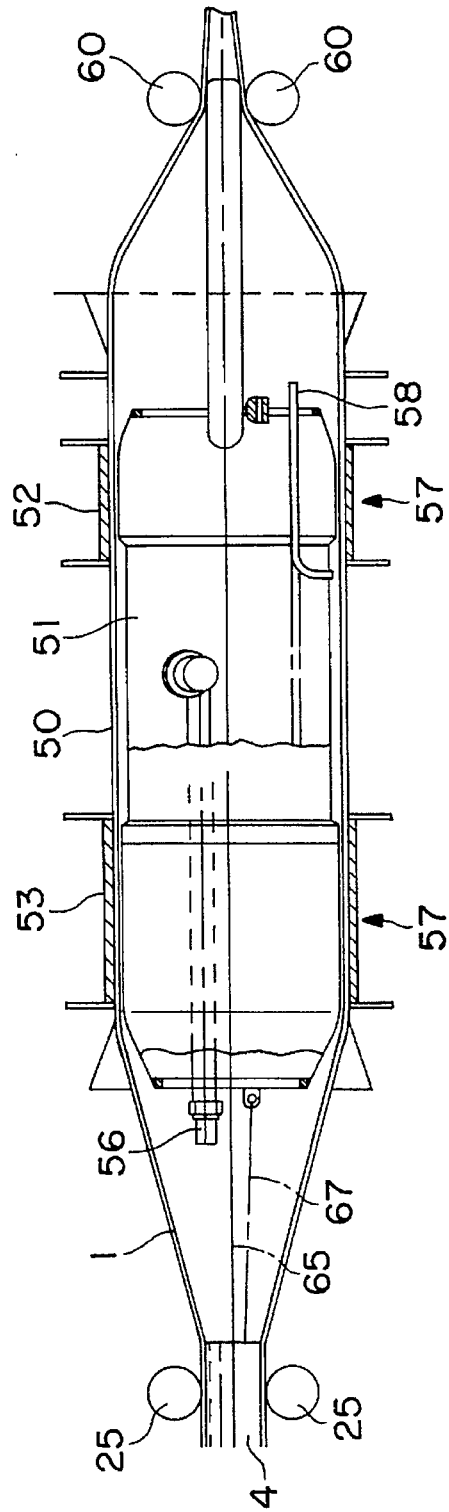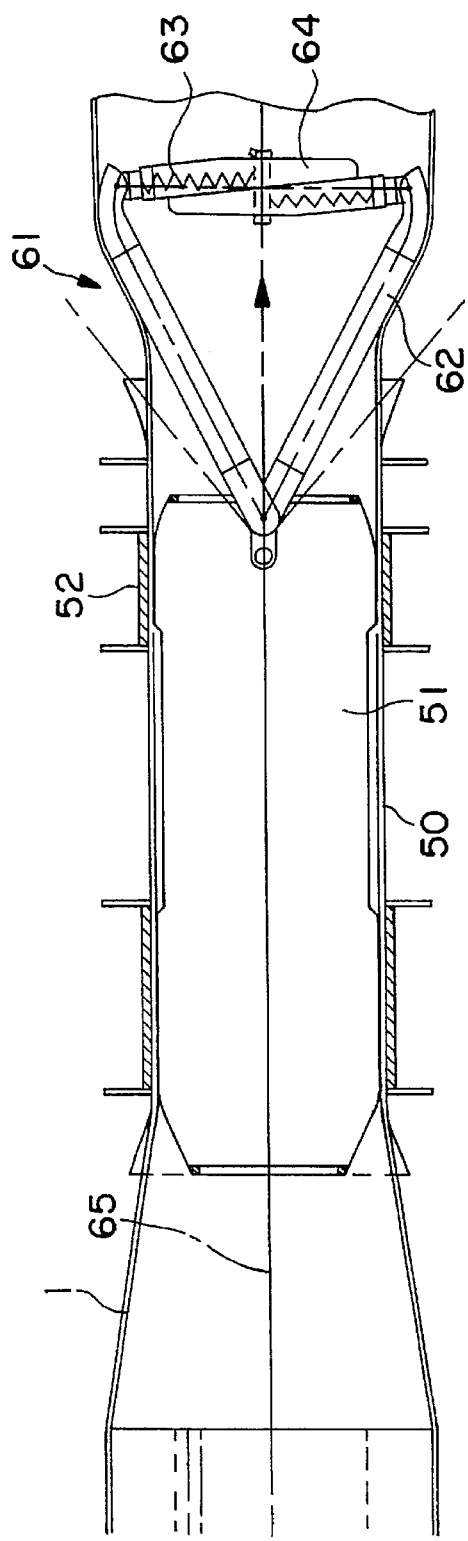

UNIT FOR PRODUCING A TUBE WITH A TUBE WALL COMPOSED OF FLEXIBLE MATERIAL WEBS

BACKGROUND OF THE INVENTION

The invention concerns a tube with a tube wall composed of flexible webs.

Tubes made out of material webs are known. They are used as inner linings of existing pipe lines, the walls of which are worn or damaged, by which a costly disassembly or replacement of the pipeline can be avoided.

DE-B-347364 describes a tube for pipe linings, of which superposed material webs made of woven or knitted glass fabric, felt, or non-woven fabric are shaped into a tube. This is followed by a resin impregnation and after insertion into the pipeline, hardening by means of UV radiation. Since the pipe has a specific unchangeable diameter, undesirable empty spaces may be formed between the pipeline and the tube.

SUMMARY OF THE INVENTION

The task of the invention is to create a tube of the type mentioned initially, which may be used both as a conducting pipe as well as an inner lining of worn or damaged pipelines. This task is solved by means of the present invention. The present invention relates to a unit for producing a tube with a tube wall composed of flexible material webs. The unit of the present invention comprises: guide rollers; a core freely mounted on said guide rollers and made of core segments coupled with one another and having a width and an axis; clamping shafts projecting over the width of the core; reels mounted on the clamping shafts including material webs in a plurality of stations over and under the core, wherein said reels are offset with respect to the axis of the core and wherein said core extends through said plurality of stations and wherein said webs are guided around said guide rollers onto said core; and a cylinder downstream of the core being coupled to a front end of the core by a coupling member.

BRIEF DESCRIPTION OF THE DRAWINGS

The invention is explained in greater detail below by means of the drawing, wherein.

FIG. shows a longitudinal section of a resin station and

FIG. 10 shows a longitudinal section of the resin station shown in FIG. 9, rotated by 90°.

DETAILED DESCRIPTION OF PREFERRED EMBODIMENTS

Figure 1:
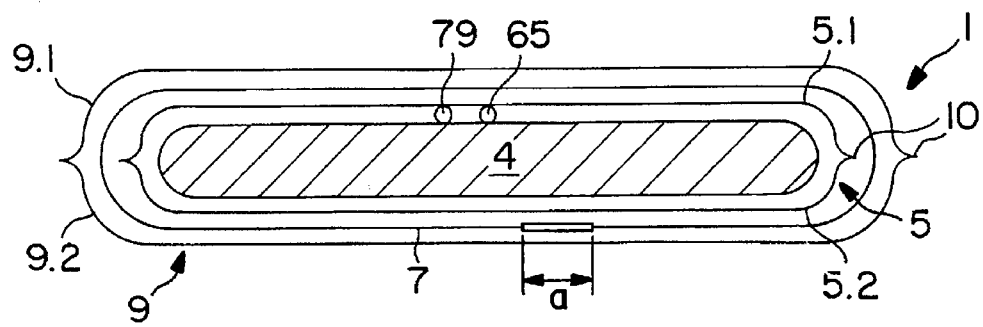
FIG. 1 shows a cross-section of a tube shaped around a roll core, with a tension web, an inner covering, and an outer covering.
Figure 2:
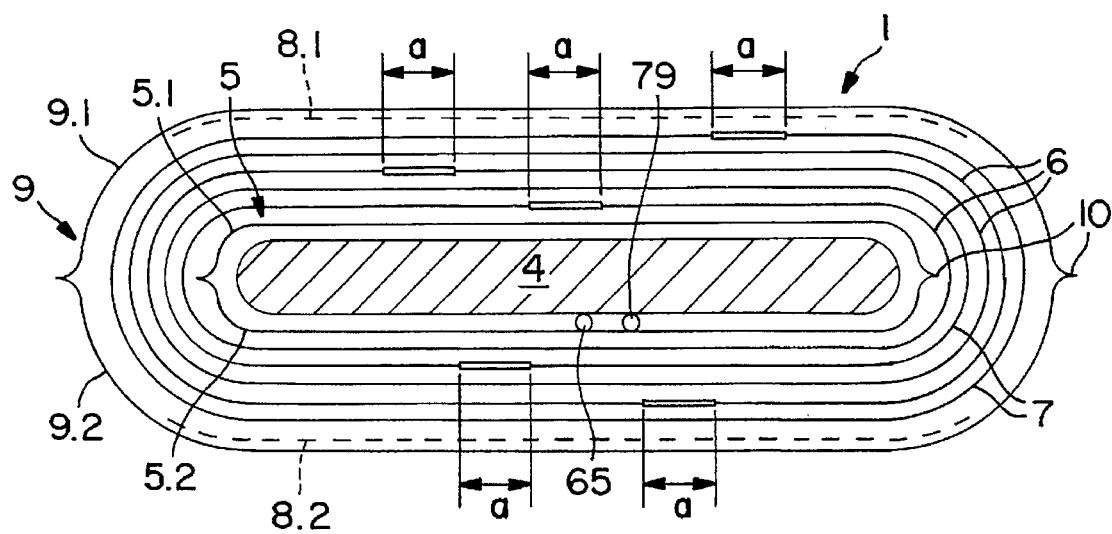
FIG. 2 shows a cross-section of a tube, which has further material webs shaped around a core in addition to the material webs used in the case of the tube shown in FIG. 1.

The starting point was the idea that the tube invented will be produced in a production unit continuously from flexible material webs as a tube so that then only adjustment to the final use, be it as a conducting pipe or as an inner lining, has to take place. Depending on the diameter and stress, the tube wall is formed out of one or more material webs. FIGS. 1 and 2 show cross-sections of tubes 1, which during the manufacturing are wound around a core 4 still to be described. For the sake of better illustration the positions of the superposed material webs have a separation which does not actually exist.

In FIG. 1 the cross-section of the tube 1 from inside out has a tubular inner covering 5, consisting of two inner webs 5.1 and 5.2, a tension web 7, and a tubular outer covering 9, consisting of two outer webs 9.1 and 9.2. The two inner webs 5.1 and 5.2 are fused with one another on their longitudinal edges 10 and thus form the tubular inner covering 5. In the same way the two outer webs 9.1 and 9.2, which overlap the tension web 7, are fused with one another on their longitudinal edges 10 and form the tubular outer covering 9. The tension web 7 lying between the inner covering 5 and the outer covering 9 is resin-impregnated in a resin station FIG. 9 and FIG. 10 still to be described, which ends the actual tube production. If the tube 1 is used as a pipeline, it is placed in a pipe mold, inflated and hardened there, e.g. by means of a light or heat source pulled through the pipe. In the case of use as a pipe lining tube 1 is placed folded into the existing line, there inflated or drawn over a mandrel, and then hardened in the same way.

For the special application of the tube 1 as a pipe lining the tension web 7 is not connected permanently with a tube, but its edges are only superposed; this forms an overlapping a. In the case of the inflation of the tube 1, this overlapping a may be shifted so that the tube 1 can be applied to possible irregularities of the inner wall of the pipe, and after hardening forms a unit closely adjacent to, or connected with, the pipe wall. The inner webs 5.1 and 5.2 and the outer webs 9.1 and 9.2 consist of an elastic material and thus do not prevent shifting of the overlappings a of the tension web 7. The overlapping a amounts to around 10–30% on the circumference of the core 4, in the middle around 15%.

In the case of larger pipe diameters the tension web can be formed oust of two webs 7 with two overlappings. If the tube 1 already is installed immediately after its manufacture and resin impregnation, the use of an inner covering 5 may be eliminated. In this case the tube 1 is installed in place and then hardened, e.g. by heating. This type of production may be used only where production and installation are close together.

The cross-section of the tube 1 shown in FIG. 2 is formed from the same webs as those in FIG. 1, but bonded fabric webs 6 and several tension webs 7 additionally are superposed in any arrangement. As an example, tube 1 in FIG. 2 shows a construction with greater wall thickness and greater wall strength, in the case of which from inside out a bonded fabric web 6 follows the inner covering 5. Then follow a tension web 7, two further bonded fabric webs 6, a further tension web 7, and finally the outer covering 9. Each two inner webs 5.1 and 5.2, and two outer webs 9.1 and 9.2 are welded at their longitudinal edges 10, as is also the case according to FIG. 1, and then form the inner covering 5 and the outer covering 9. The outer coverings 9.1, 9.2 of the tubes 1 as shown in FIG. 2 may have safety webs 8.1, 8.2 on the inside and be partially glued to them. The safety webs 8.1 and 8.2 prevent the slipping of the outer covering 9 on the adjacent reinforcing web 7. The safety webs 8.1, 8.2 do not extend to the longitudinal edges 10 of the outer webs 9.1, 9.2, see FIG. 2. With the exception of the two coverings 5,9 all bonded fabric webs 6 and tension webs 7 are provided with overlappings a, so that upon installation the entire tube 1 can lie completely against the inner wall. The hardening of the resin-impregnated bonded fabric and tension webs 6, 7 takes place only on site, and with this the formation of a massive tube body. It is essential that the overlappings a of the individual webs lie offset to one another, as FIG. 2 shows, in order to avoid the formation of bulges.

Suitable materials for the individual webs are: Inner and outer covering 5; a thin, elastic, styrene-resistant film, e.g. consisting of polyethylene, polypropylene, poylurethane, polyamide. Also it can be a compound film of these materials and pigmented or aluminum-coated as an outer covering 9.

Bonded fiber web 6: natural or artificial fibers or a mixture thereof.

Tension web 7: glass fiber web or layer, mats or combinations thereof for receiving the forces acting on the tube, in particular tension forces.

Safety web 8: a web of tangled organic fibers, such as cellulose, or types of paper.

Figure 3:
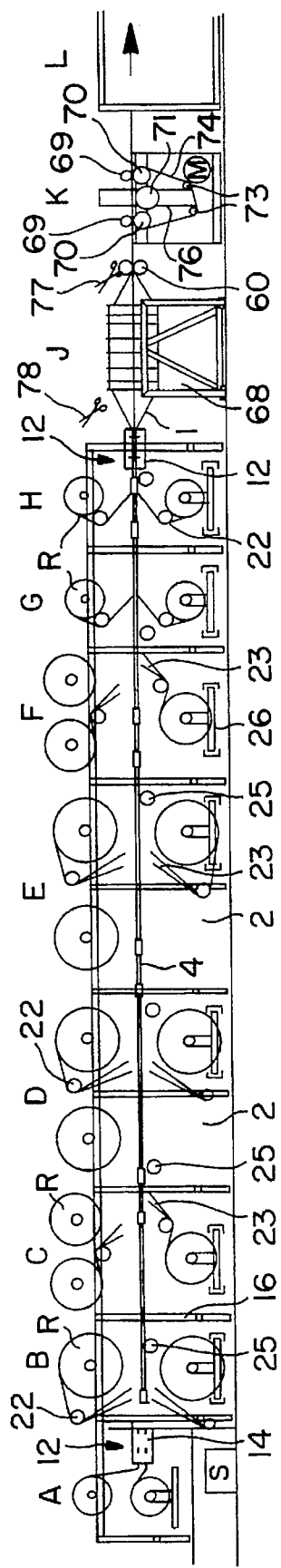
FIG. 3 shows a schematic side view of an arrangement for shaping the tube, e.g. in accordance with FIGS. 1 and 2.
Figure 4:
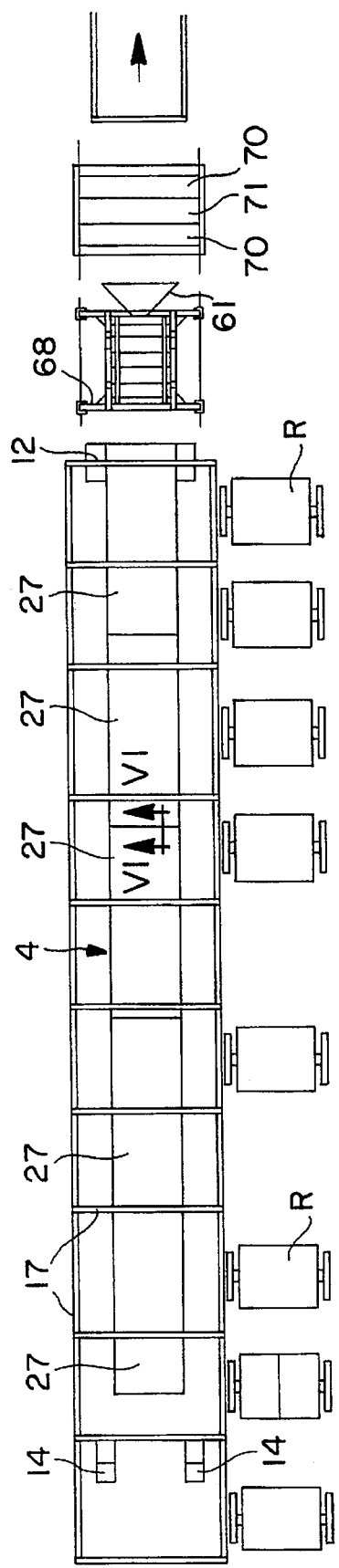
FIG. 4 shows a top view of the arrangement shown in FIG. 3.

FIGS. 3 and 4 schematically show a unit with which the tubes 1 are produced. It consists of several stations A–H, by which the tracks are drawn from reels R and wound around the core 4 to a one- or several layer tube of any length, impregnated and continuously drawn by means of a drawing station K and laid into a storage bin L. In each station B–F several reels R, e.g. 2–4 reels are mounted so that they can turn, of which in each case a part of the reels R are unwound and the other reels R serve as a reserve. Empty spaces 2 also can be equipped with reels R. In each case two webs are wrapped simultaneously in stations A, G, and H, in A and H for producing the inner and outer coverings 5, 9, and in G for simultaneous application of the two safety webs 8.1, 8.2 before the application of the outside covering 9. Bonded fabric webs 6 or tension webs 7 are wrapped in stations B–F, e.g. boarded fabric webs 6 in stations B, D, E and tension webs 7 in stations C and F. However, the sequence of the stations B–F can be varied in any way. Unnecessary stations, e.g. in the case of producing the tube in accordance with FIG. 1, may be switched off without changing the facility.

A welding station 12, which has two welding places 14 for welding the longitudinal edges 10 of the inner webs 5.1, 5.2 and the outer webs 9.1, 9.2, is located between stations A and B as well as after station H.

Figure 5:
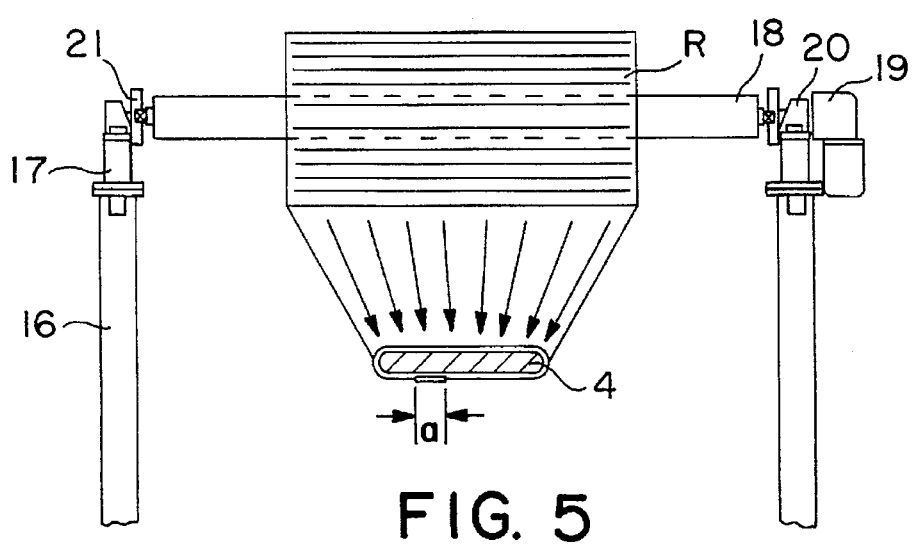
FIG. 5 shows a side view of a material web roll at the time of unrolling a web onto the roll core.

The unit, see FIG. 3, is a frame consisting of posts 16 and bars 19, on which the reels R are supported and driven, see FIG. 5. A reel R is fastened to a shaft, e.g. a pneumatically operated clamping shaft 18. According to the predetermined position of the overlapping a the reel R is fastened laterally to the core 4 on the clamping shaft 18, which is driven by a motor, e.g. a drive motor 19. The drive motor 19 is mounted on a base 20 and coupled detachably with the shaft 18. When a reel R is completely unwound, the end of the web is glued with beginning of the next reel R and thus ensures uninterrupted preparation of the tube 1. The clamping shaft 18 with the unwound reel can be easily removed after releasing the connection with the drive motor 19, since it is mounted in split bearings 21. In place of the removed reel a shaft 18 with a new reel R is installed by means of a lifting device, e.g. a crane, and coupled with the drive motor after locking the bearing 18.

FIG. 5 shows the wrapping of the web onto the core 4 in a simplified version. As is evident from FIG. 3, the unwound web is guided over a guide roller 22 and steered onto the core 4 with a guide track 23, e.g. a shaped plate. The web is guided onto the core 4 by means of guide rollers 25, which are close to the side, top and bottom of the core 4. The reels R on the underside of the core in a similar way are fastened to clamping shafts 18, which are not brought into position directly, but by means of special reel carriages 26, which may be mulled out from the side like drawers, see FIG. 4, in which position the reels easily can be changed with a lifting device.

In FIG. 3 the stations A, G, and H have no reserve reels. The webs used where are significantly thinner than the bonded fabric and tension webs 6,7 and therefore need to be changed only rarely because of their great length.

In FIG. 4 the upper reels R are omitted in order to show the core 4 more easily. The core 4 extends from the station B to the station H and, with the exception of the end at station B, lies freely on guide rollers 25 in the frame, in order to make it possible to have uninterrupted transport of the webs 6–9, with the exception of the inner covering, wrapped around the core 4. The guide rollers 25 ensure that the webs 6–9 are drawn onto and shaped around the core 4.

Figure 6:
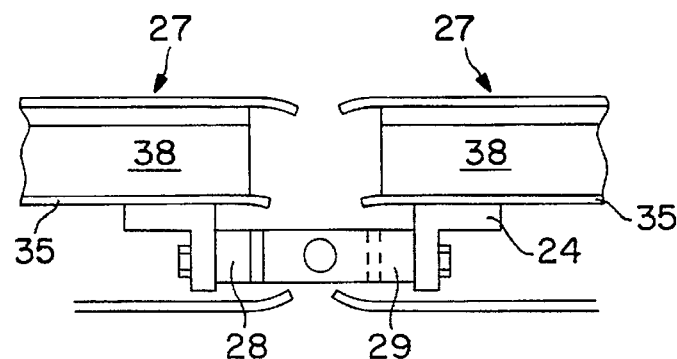
FIG. 6 shows a section along the line VI—VI in FIG. 4 with a coupling for connecting two adjacent core segments.
Figure 7:
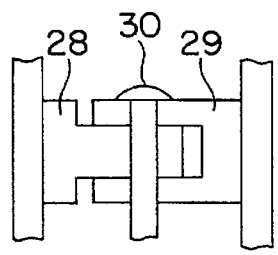
FIG. 7 shows a top view of the coupling shown in FIG. 6.

The core 4 consists of several essentially hollow core segments 27 lying beside one another, which are connected with a coupling consisting of two shackles 28,29 and a bolt 30, see FIG. 6 and 7.

Figure 8:
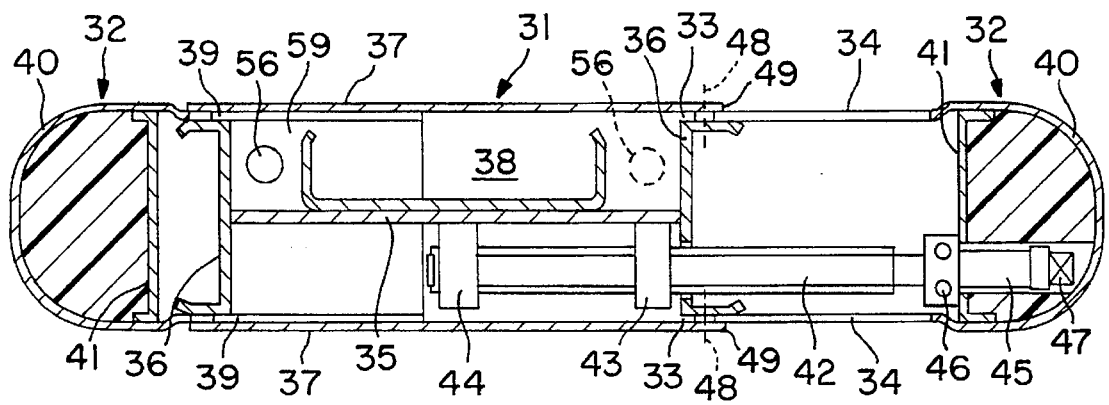
FIG. 8 shows a cross-section of a core segment consisting of a middle part and to edge pieces, one of them extended, of which the roll core crossing the arrangement with several core segments is formed.

The shackles 28, 29 are located on angle pieces which are mounted on the underside of crosspieces 35 (see FIG. 8). The core segments 27 are in three parts, see FIG. 8. Connected to a middle part 31 are two rounded adjustable edge pieces 32 mounted on its longitudinal sides. Two longitudinally running U-sections 36, connected with a crosspiece 35 on the middle part 31 are covered with a thin covering 37 and form together a box-like hollow piece. A U-shaped channel 38 extends over the entire length of the middle part 31 in the upper part. During the manufacturing of the tube 1 the tubular inner covering 5 produced and welded in station A lies in this channel. Only after resin impregnation is the inner covering unfolded and placed against the resin-impregnated inner wall of the tube 1. The shell-shaped edge pieces 32 consist of two flat wall parts 39 and an curved part 40, which parts on the transition of the two parts 39, 40 are reinforced by means of a U-shaped crosspiece 41.

The flat wall parts 39 of the edge pieces 32 extend under deck walls 37 of the middle part 31 and have slots 34, which with spot fastening points 48 form a guide for the edge pieces 32. The fastening points 48 hold the arm of the U-section 36 and the covering 37 with a somewhat greater separation than the thickness of the covering 37. The fastening points 48 can be, e.g. a rivet connection with a washer 49 as a spacer and a guide for the slot 34. A spindle drive with a spindle 42, a two-part spindle nut 43, and a spindle guide 44 is mounted in the lower part of the middle part 31, an extension 45 of the spindle 42 projecting into the arched part 40 and being connected with the reinforcing bracket 41 via a rotating coupling, e.g. a ball or roller bearing 46, and a section, e.g. a square head 47, being molded onto the free end of the extension. The spindle can be rotated with a correspondingly shaped tool through an opening 54 in the edge piece 32, which causes a displacement of the edge piece 32 and thus a change in the width of the core segment 27. An identical spindle drive (not shown for the second, opposite, edge piece 32 is located offset to the spindle 42. If larger or smaller segment widths are desired, other core segments, but of the same type, have to be prepared. Five sizes of core segments 27 for forming corresponding tubes are required for tube diameters of approximately 150 mm up to approximately 800 min. If the tube 1 is finished after applying the outer covering 9 and after fusing the longitudinal edges 10 at station H, it is impregnated with resin, e.g. a polyester, polyurethane, or epoxy resin at resin station J, see FIGS. 9 and 10. Resin station J has a circular cylindrical outer casing 50 and an inner cylinder 51 corresponding to the circumference of the core 4. The tube 1, first formed around the core 4, is guided through the slit 52 formed between them, and is calibrated by stretching into the overlappings. The cylinder 51 has a circular cylindrical constriction 53, which forms a resin chamber for distributing the resin fed through at least one line 56. A compressed air feed of around 0.5–4 bar on both sides of the constriction 53 is indicated by the arrow 57, by means of which the friction of the tube 1 in the slit 52 is reduced. The resin is fed at a pressure of 1–20 bar, which produces a good impregnation of the material webs lying on top of one another. Lines 58 for supplying solvent for cleaning the resin chamber, but which are not connected during tube production, also are provided.

The tube 1 leaves the core 4 as a flat tube, is shaped into a pipe at resin station J, calibrated between the outer casing 50 and the cylinder 51 and impregnated with resin at the same time. On the output side the tube 1 is pressed flat by shaping rollers 60 and guided to the drawing station K, on which the finished, not yet hardened, tube 1 is placed in the storage bin L, e.g. as folded layers lying on top of each other.

The inner covering 5 lying folded together in the channel 38 of the core segments 27 reaches to the interior of the cylinder 51, at the end of which it is unfolded by means of a spring-mounted fork 61, which pushes it with its arms 62 onto the tube 1 (FIGS. 4 and 10). The arms 62 are pushed apart by springs 63, which lie in two half shells 64, capable of moving toward one another, mounted on the fork ends. The fork 61 is held by a cord 65 or the like, which extends through the entire core 4 up to the beginning of station A and in forming the inner covering 5 is mounted in the interior of the latter, see FIGS. 1 and 2. Also the cylinder 51 of the resin station J cannot be supported on the outer casing 50, but is held on the end of the core 4 with a 3-point wire system 67 or the like. On the other hand the outer casing 50 is mounted on a frame 68 (FIGS. 3 and 4) and can receive the forces arising during the drawing of the tube 1. Also the line or lines 56 for the resin feed have to be guided in the interior of the core 4, for which passages 59 are hollowed out on both sides of the channel 38. Also a second resin line 56 can be provided for producing larger tubes.

In the drawing station L the tube 1 is given a specific speed which is used for controlling the motors for the reels R in stations A–H. The entire unit can be operated with a central control unit S. A roller 71 is mounted in the drawing station K in the middle under two pairs of rollers 69, 70. A flat belt 74 wraps around the roller 71 and the lower roller 70 of the pair of rollers 69, 70 together with guide rollers 73, which rollers are driven by a motor, roller 71 being mounted vertically adjustable in a stand 76. The rollers of the roller pair 69, 70 form a slit for the passage of the tube 1, which winds around the roller in a loop and thus is pressed against the roller 70 from below by the flat belt 74. Thus the tube 1 be guided through the drawing station K without slipping and without pressing it too greatly. The rollers 70 of the roller pairs 69, 70 and the roller 71 are driven together via a chain drive by means of a motor M. The speed of the tube 1 measured in the drawing station K is used for controlling the drive motors 19 for driving the reels R, switching the reels R on and off and all other functions of the unit also being control led by the control unit S.

If the desired tube length is produced, the tube 1 is cut in two by means of schematically represented shears 77 lying between the resin station J and the drawing station K. If another tube size has to be produced, the tube 1 also has to be cut in two by means of further schematically represented shears 78 lying between in front of the resin station J, and the tube part al ready present in the resin station has to be removed, in which case, however, the cord 65, which holds the fork 61, and the wire system 67, which holds the cylinder 51 of the resin station J, and prevents turning thereof, are not cut. A towline 79 also can be inserted during the formation of the tube 1, see FIGS. 1 and 2, which lies as the cord 65 on the inside of the inner covering 5 and moves with the tube 1 advancing on the core 4. If a specific tube length is cut off and used either for tube production or for tube covering, identical length of the towline 79 is available for, e.g., pulling a hardening device for hardening through the tube 1.

The unit described can be used to produce tubes of any length continuously and endlessly, which have different wall thicknesses and different wall structures depending on the purpose of application and can be cut into different lengths.

I claim:

1. A unit for producing a tube with a tube wall composed of flexible material webs which comprises: guide rollers; a core freely mounted on said guide rollers and made of core segments coupled with one another and having a width and an axis; clamping shafts projecting over the width of the core; reels mounted on the clamping shafts including material webs in a plurality of stations over and under the core, wherein said reels are offset with respect to the axis of the core and wherein said core extends through said plurality of stations and wherein said webs are guided around said guide rollers onto said core; and a cylinder downstream of the core being coupled to a front end of the core by a coupling member.

2. A unit according to claim 1 wherein said coupling member is a wire.

3. A unit according to claim 1 wherein the core is followed by a resin station including a circular outer casing and an inner cylinder.

4. A unit according to claim 3 wherein said cylinder includes a constriction and forms a resin chamber.

5. A unit according to claim 3 wherein the circular outer casing and inner cylinder form a slit therebetween, wherein a formed tube is guided and calibrated through the slit.

6. A unit according to claim 5 including a feed line for the resin extending through the core.

7. A unit according to claim 6 including a fork downstream of the inner cylinder of the resin station for opening an inner covering of the tube, and a cord extending through the core holding said fork.

8. A unit according to claim 3 wherein said resin station is followed by a drawing station for transporting the tube through the unit.

9. A unit according to claim 8 wherein said drawing station includes driven rollers and a flat belt wrapping therearound and a vertically adjustable driven roller between the driven rollers, wherein the belt runs through the driven rollers and around the vertically adjustable roller with the formation of a loop within which the tube is carried.

10. A unit according to claim 9 wherein the core includes core segments having two U-shaped sections and a middle part shaped as a crosspiece and two edge pieces.

11. A unit according to claim 6 including a spindle drive for adjusting the width of the core segment associated with each edge piece, which drive is accessible through an opening in the edge pieces.

12. A unit according to claim 11 wherein said edge pieces include a flat part and slots located on the flat part in the direction of motion of the tube.

13. A unit according to claim 12, wherein the flat part moves under a covering of the middle part which is attached to the U-shaped section of the middle part with attachment points with the formation of a slit, the attachment points forming a guide for the slots.

14. A unit for producing a tube with a tube wall composed of flexible material webs which comprises: guide rollers; a core freely mounted on said guide rollers and made of core segments coupled with one another and having a width and an axis; clamping shafts projecting over the width of the core; reels mounted on the clamping shafts including material webs in a plurality of stations over and under the core, wherein said reels are offset with respect to the axis of the core and wherein said core extends through said plurality of stations and wherein said webs are guided around said guide rollers onto said core; and a cylinder downstream of the core being coupled to a front end of the core, wherein the core is followed by a resin station including a circular outer casing and an inner cylinder, wherein said cylinder includes a constriction and forms a resin chamber, wherein the circular outer casing and inner cylinder form a slit therebetween, wherein a formed tube is guided and calibrated through the slit, including a feed line for the resin extending through the core, including a fork downstream of the core for opening an inner covering of the tube, and a cord extending through the core holding said fork.

15. A unit for producing a tube with a tube wall composed of flexible material webs which comprises: guide rollers; a core freely mounted on said guide rollers and made of core segments coupled with one another and having a width and an axis; clamping shafts projecting over the width of the core; reels mounted on the clamping shafts including material webs in a plurality of stations over and under the core, wherein said reels are offset with respect to the axis of the core and wherein said core extends through said plurality of stations and wherein said webs are guided around said guide rollers onto said core; and a cylinder downstream of the core being coupled to a front end of the core, wherein the core is followed by a resin station including a circular outer casing and an inner cylinder, wherein said cylinder includes a constriction and forms a resin chamber, wherein the circular outer casing and inner cylinder form a slit therebetween, wherein a formed tube is guided and calibrated through the slit, including a feed line for the resin extending through the core, including a fork downstream of the core for opening an inner covering of the tube, and a cord extending through the core holding said fork, wherein said resin station is followed by a drawing station for transporting the tube through the unit, wherein said drawing station includes driven rollers and a flat belt wrapping therearound and a vertically adjustable driven roller between the driven rollers, wherein the belt runs through the driven rollers and around the vertically adjustable roller with the formation of a loop within which the tube is carried.

* * * * *